Figure 1:
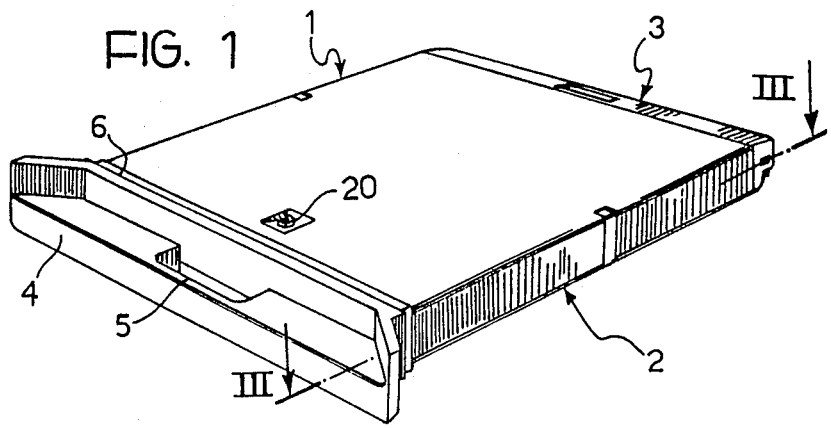

United States Patent [19]

Gandolfo

[11] Patent Number: 4,809,313

[45] Date of Patent: Feb. 28, 1989

[54] X-RAY FILM FEEDING MAGAZINE USABLE IN FILM HANDLING AUTOMATIC APPARATUS

[75] Inventor: Rino Gandolfo, Savona, Italy

[73] Assignee: Minnesota Mining and Manufacturing Company, St. Paul, Minn.

[21] Appl. No.: 21,507

[22] Filed: Mar. 4, 1987

[30] Foreign Application Priority Data

Mar. 12, 1986 [IT] Italy .................. 19729 A/86
Jun. 12, 1986 [IT] Italy .................. 20769 A/86

[51] Int. Cl.$^4$ .................. B65G 57/00; G03D 13/06
[52] U.S. Cl. .................. 378/182; 378/173; 378/167
[58] Field of Search .................. 378/173, 174, 172, 167, 378/181, 182, 187; 354/276, 174; 217/117

[56] References Cited

U.S. PATENT DOCUMENTS

| | | | |
|---|---|---|---|
| 3,934,735 | 1/1976 | Schmidt | 378/182 |
| 4,031,400 | 6/1977 | Hunt et al. | 378/173 |
| 4,482,233 | 11/1984 | Bauer et al. | 378/182 |
| 4,529,189 | 7/1985 | Konishi et al. | 271/117 |
| 4,555,213 | 11/1985 | Tamura et al. | 378/173 |
| 4,663,528 | 5/1987 | Fujiwara et al. | 378/182 |
| 4,715,595 | 12/1987 | Ishigaki | 271/117 |

*Primary Examiner*—Carolyn E. Fields
*Assistant Examiner*—Joseph A. Hynds
*Attorney, Agent, or Firm*—Donald M. Sell; Mark A. Litman

[57] ABSTRACT

X-ray film feeding magazine usable in a film handling automatic apparatus, comprising a tray (3) in which is defined a housing (26) to receive an x-ray film packet (F). The film housing is delimited by a front gauge (17) and at least a side gauge (28) which can be shifted between a stand-by position and a work position to reduce the housing dimensions to prearranged values. The shifting of said movable front and side gauges from the stand-by to the work position is controlled by means of contrast elements (15) which are associated with the front gauge and accessible from the outside to apply an external thrust to the front and side gauges.

16 Claims, 8 Drawing Sheets

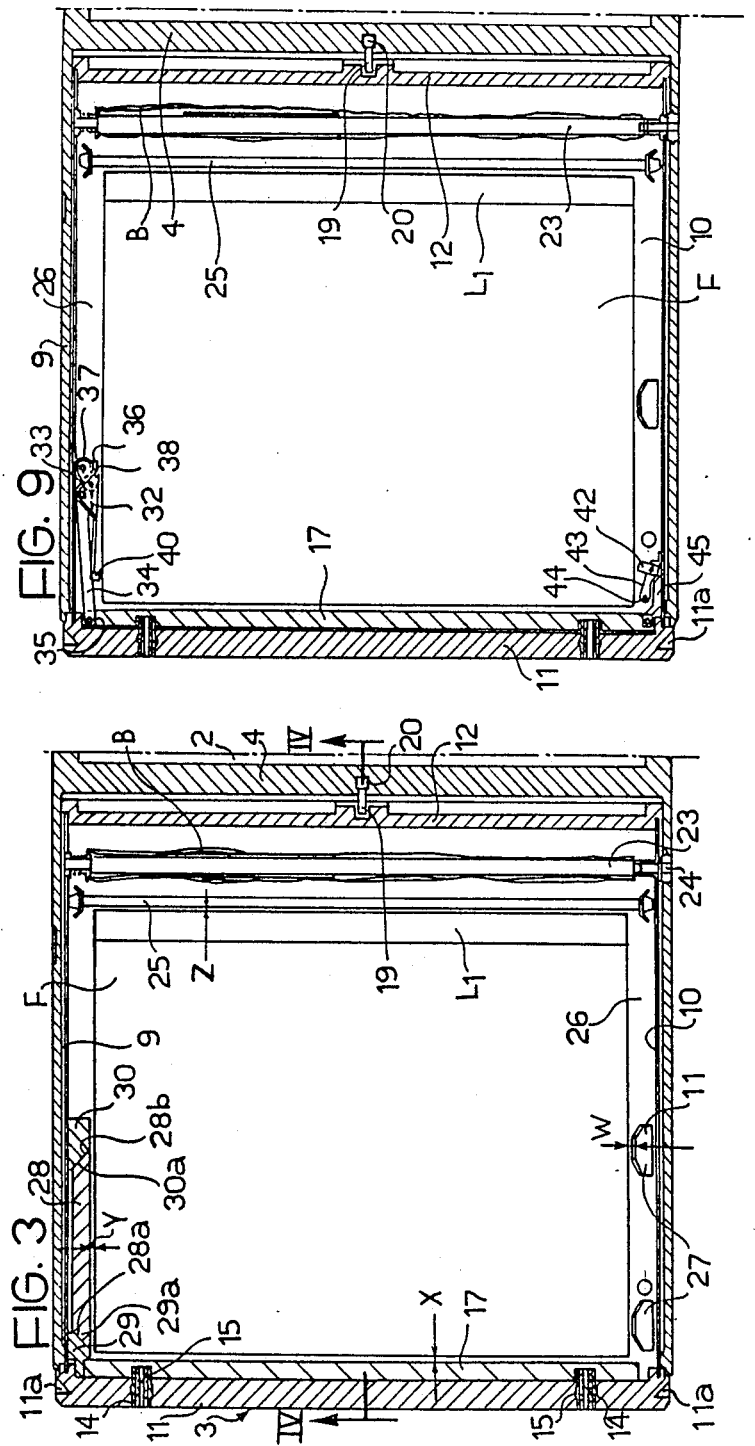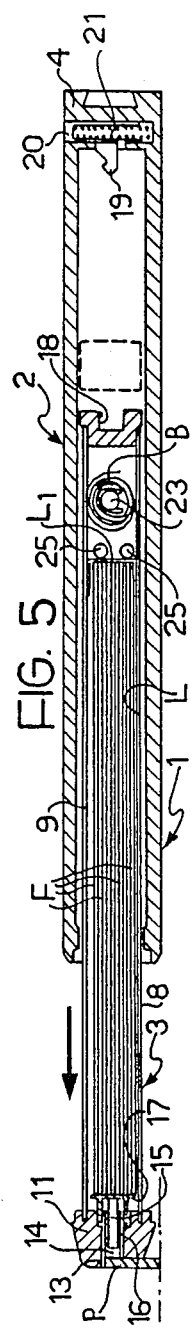

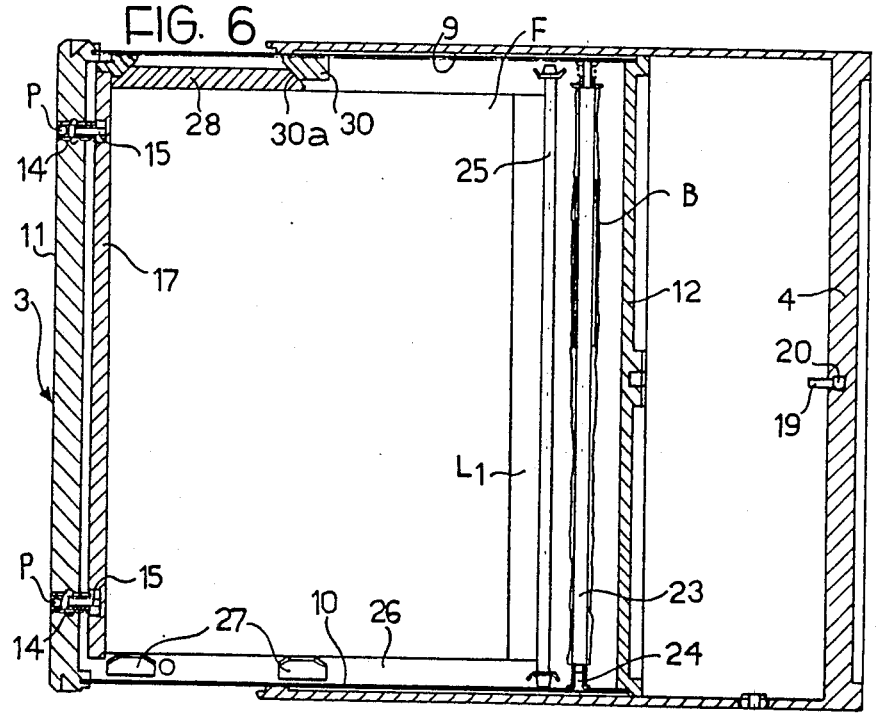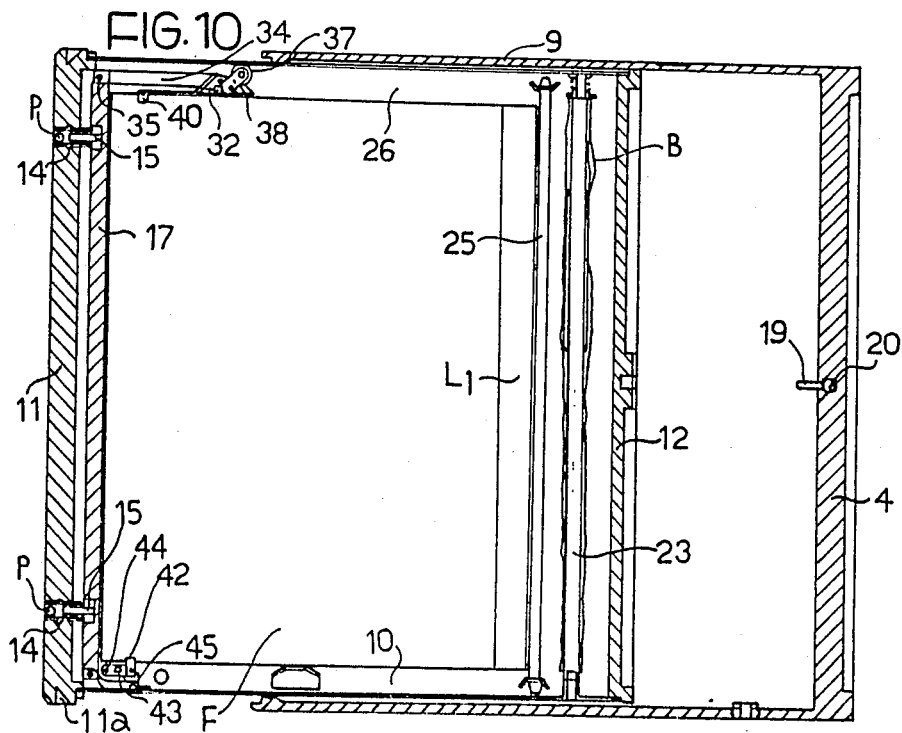

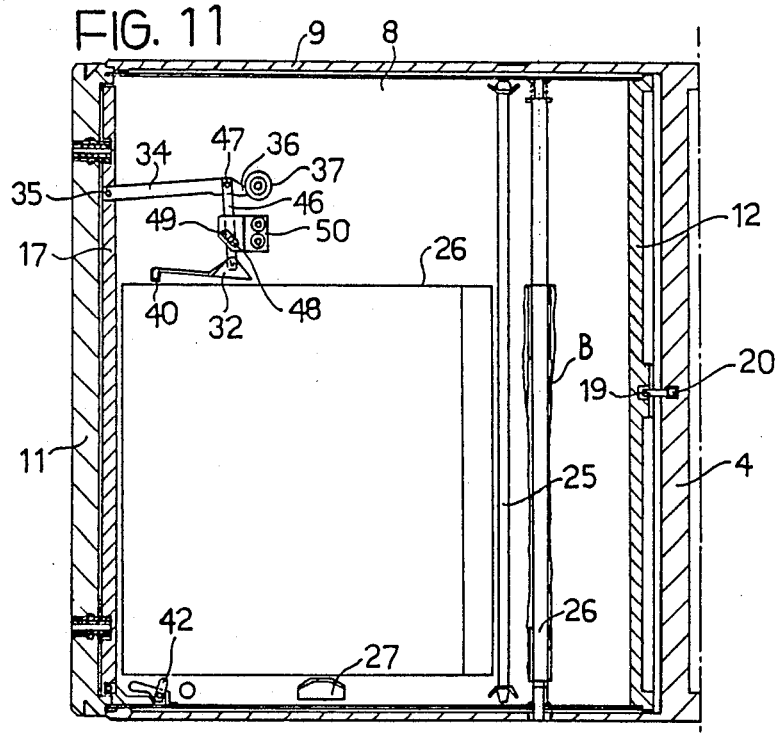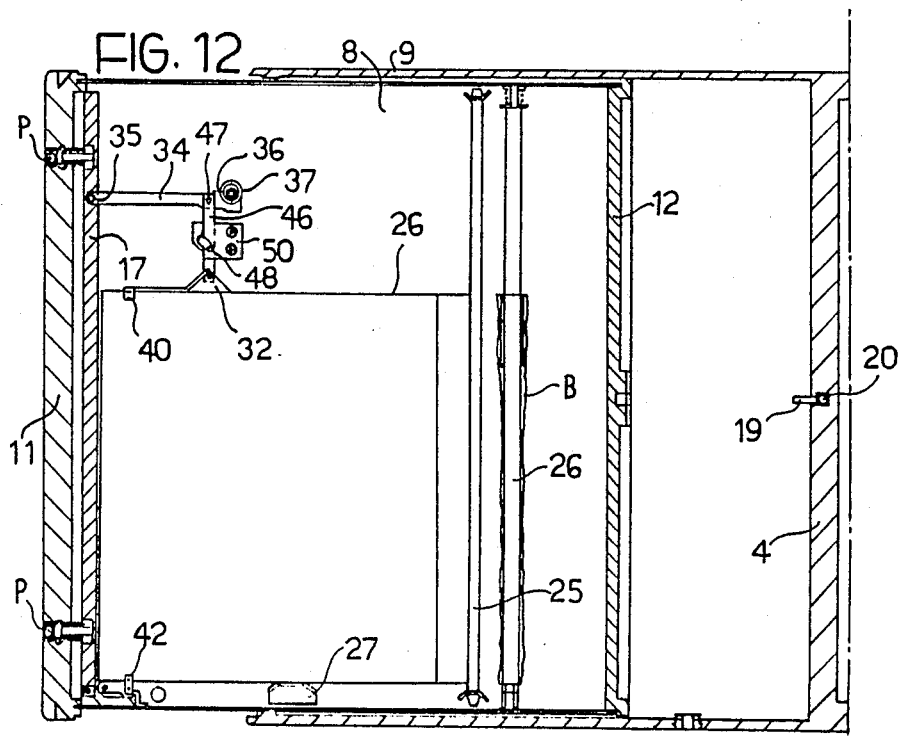

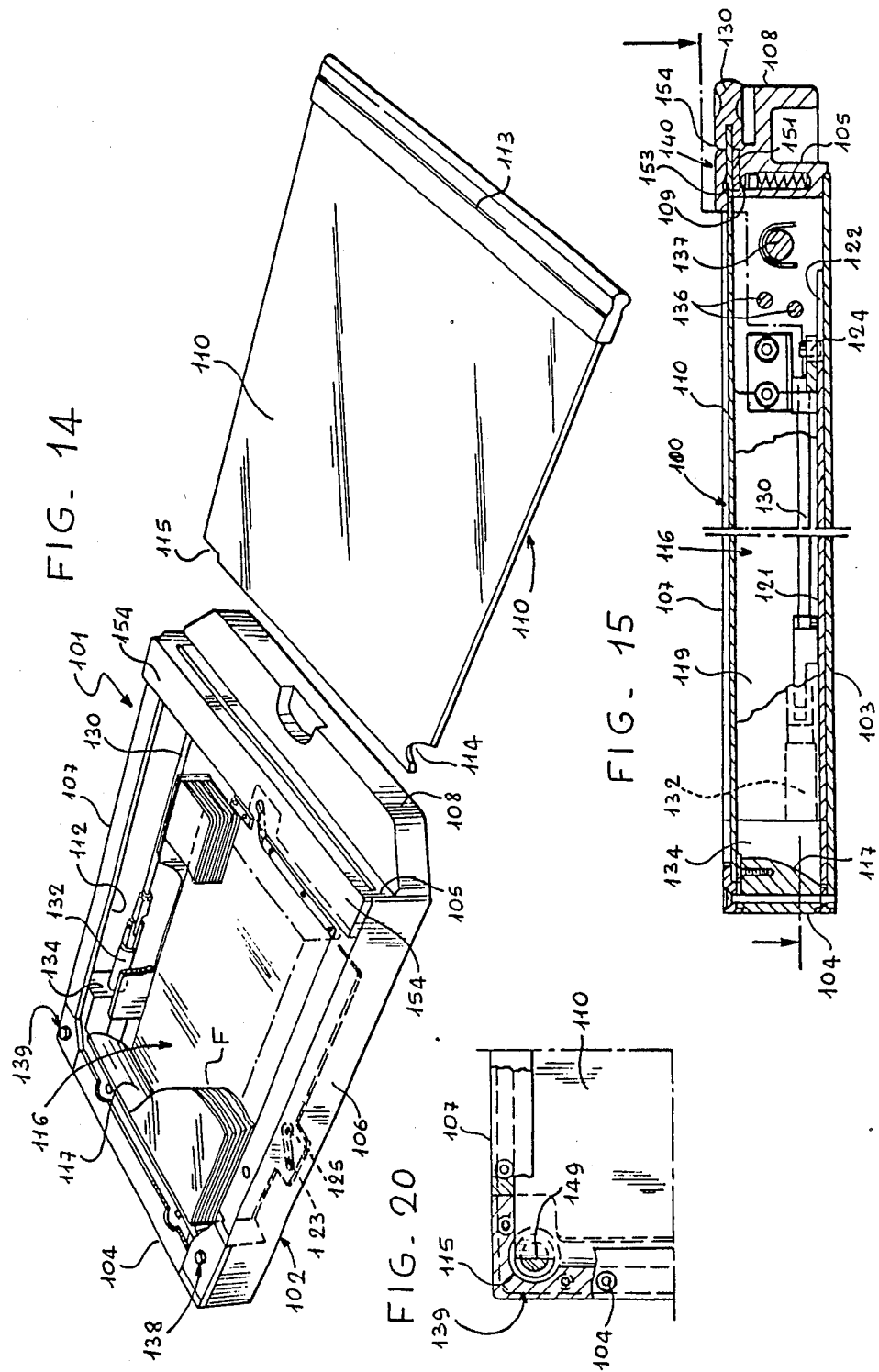

X-RAY FILM FEEDING MAGAZINE USABLE IN FILM HANDLING AUTOMATIC APPARATUS

The present invention relates to x-ray film feeding magazines usable in day-light film handling automatic apparatus.

In general, the invention relates to a film feeding magazine comprising a tray having a bottom wall, a front wall, a back wall and two side walls; an insertion direction of the tray into the apparatus is defined as from said back wall to said front wall, and a quadrangular housing is formed in the tray for receiving an x-ray film packet.

In particular, the invention relates to a feeding magazine of the above type comprising a case and a tray included therein in the form of a drawer sliding between a light-tight closed position and an opened position in which said quadrangular housing is ready to receive said x-ray film packet.

A feeding magazine of this type is described and illustrated for example in Italian Patent No. 1,062,043 of the same Applicant, wherein said magazine is used to receive an x-ray film packet contained in a flexible light-tight envelope and wherein the tray is provided with rolling means driven from the outside of the magazine to remove the light-tight envelope from the film packet placed in the housing of the tray.

Such feeding magazine can be used in film day-light handling automatic apparatus, i.e. without the use of dark rooms, which briefly comprise receiving and opening devices for the feeding magazine, devices for picking up and drawing out of the films contained therein and for carrying such films towards other regions of the apparatus where specific operations are performed on such films.

To make such devices work properly and without any troubles, the x-ray films are to be exactly positioned and centered with respect to such film pick-up devices. This is a particularly critical problem with such feeding magazines wherein the film packet remains positioned within the housing of the tray in the magazine with a given clearance (normally of some mm) due to the removal therefrom of the light-tight flexible envelope, thus preventing the necessary precision in the film handling.

To solve this problem, centering devices could be used which are suitable for correctly positioning the films after drawing them out from the magazine. Such devices would however cause obvious disadvantages deriving both from the realization costs and from difficulties of installation in the automatic handling apparatus.

It is within the present invention to avoid such drawbacks by realizing an x-ray film feeding magazine of the above defined type which allows correct film centering to be obtained directly inside the housing of the tray in a simple and cheap manner, thus avoiding the auxiliary positioning devices normally needed after the film drawing-out step.

To effect such results, the present invention provides an x-ray film feeding magazine, for use in an automatic film handling apparatus, comprising a tray having a bottom wall, a front wall, a back wall and two side walls and quadrangular housing means formed in the tray for receiving an x-ray film packet, comprising a front end gauge near the front wall of the tray, a back end gauge near said back wall and two side gauges near said two side walls, one of said end gauges and at least one of said side gauges being movable between a stand-by position for receiving the x-ray film packet with clearance and a work position for centering the films of the packet, and externally driven actuator means in the tray to move said movable gauges from the stand-by position to the work position.

The present invention particularly provides, in one aspect, an x-ray film feeding magazine for use in a film handling automatic apparatus comprising a case having an open front wall and a sliding tray (or drawer) included therein movable through said open wall between a light-tight closed position of the case and an opened position where said tray protrudes on case prolongation, said tray having a bottom wall, a front wall, a back wall and two side walls and quadrangular housing means formed in the tray for receiving an x-ray film packet, comprising a front end gauge near the front wall of the tray, a back end gauge near said back wall and two side gauges near said two side walls, one of said end gauges and at least one of said side gauges being movable between a stand-by position for receiving the x-ray film packet with clearance and a work position for centering the films of the packet, and externally driven actuator means in the tray to move said movable gauges from the stand-by position to the work position.

In another particular aspect, the present invention provides for an x-ray film loading magazine for use in a film automatic handling apparatus, in particular an apparatus for day-light transfer of video images onto the x-ray films, comprising a tray having a bottom wall, an openable cover opposite to said bottom wall and front, back and side walls defining quadrangular housing means to receive an x-ray film packet which can be reached from the outside by opening said openable cover to allow the films to be taken out, said housing being delimited with front, back and side gauges, characterized by the fact that said housing is defined by a supporting plate for the x-ray films movable parallel to the bottom wall of tray and carrying said back gauge and one of said side gauges, the other side gauge and front gauge being stationary with respect to said movable supporting plate, and external control actuator means being provided to operate a diagonal translation of said movable supporting plate with respect to bottom wall of tray from a stand-by position for receiving with clearance the x-ray film packet and a film centering work position wherein said back and side gauges carried by movable supporting plate are shifted closer to said stationary front and side gauges of a given quantity to remove said clearance. Preferably, said stationary front gauge has an arched shape with the convex surface turned towards said housing.

With this invention, an effective centering of the films is obtained by moving gauges inside the magazine through outside working of actuator means of the magazine. Preferably, such actuator means comprise contrast elements associated with the movable end gauge and accessible from the outside through the front wall of the tray. By means of contrast elements an external thrust is applied to said movable end gauge to move it from the stand-by to the work position. Elastic return means are associated with said contrast elements to keep said movable end gauge in the stand-by position in the absence of said external thrust.

The contrast elements advantageously comprise spring pins connected with the front gauge and slidingly housed in respective guiding notches formed in said front wall of the tray The magazine conveniently furthermore comprises connection means among said end movable gauge and at least one side movable gauge in order to operate the movement thereof from the stand-by to the work position simultaneously.

According to an embodiment of the invention, only one of said side gauges is movable, and the connection means comprise a supporting plate for the x-ray films slidingly guided on said bottom wall of the tray in diagonal direction of said housing, said movable side and end gauges being fixed on the supporting plate.

Figure 2:
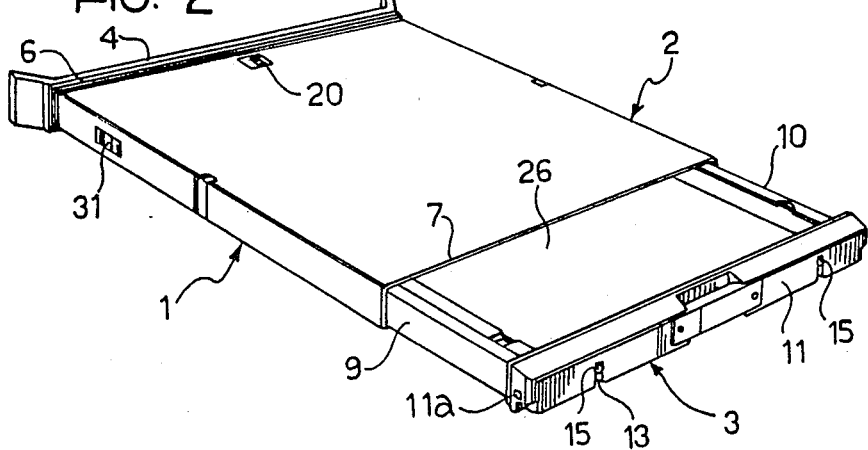
Figure 4:
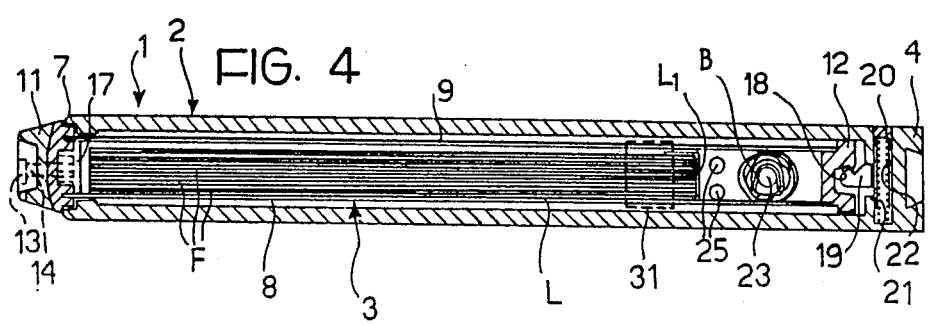
Figure 7:
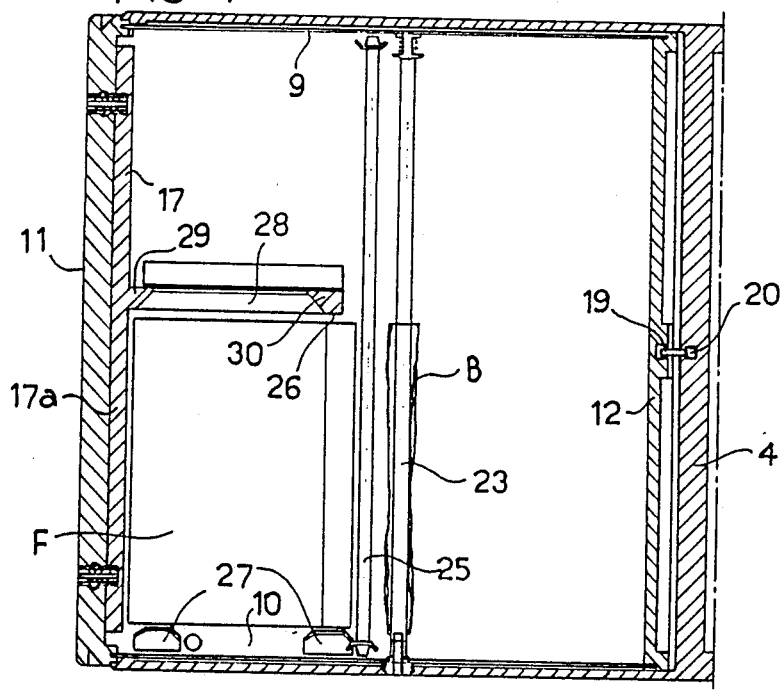
Figure 8:
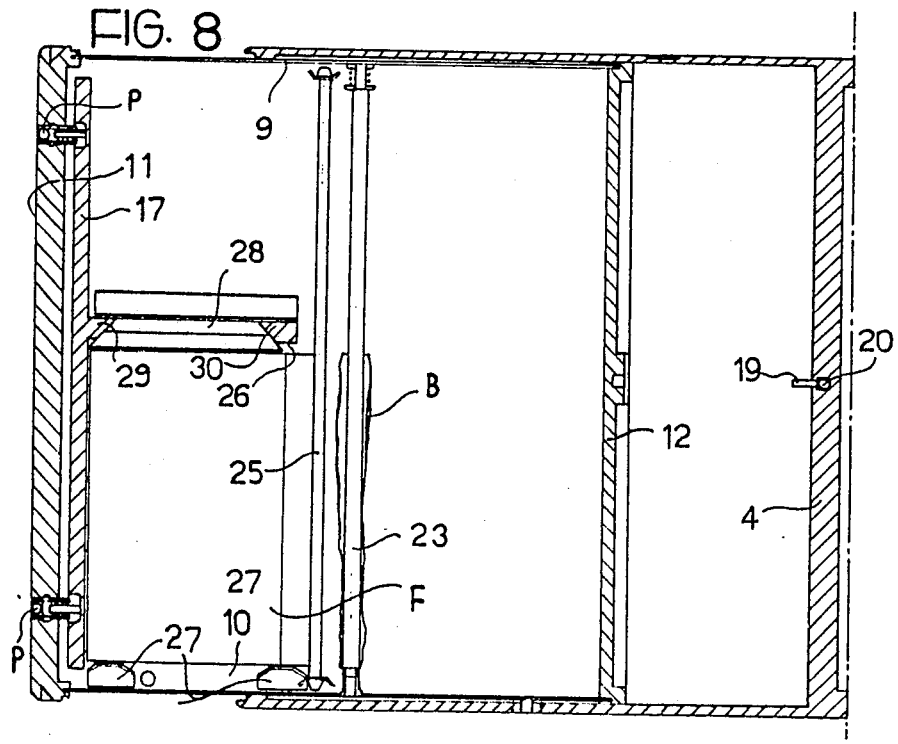
Figure 16:
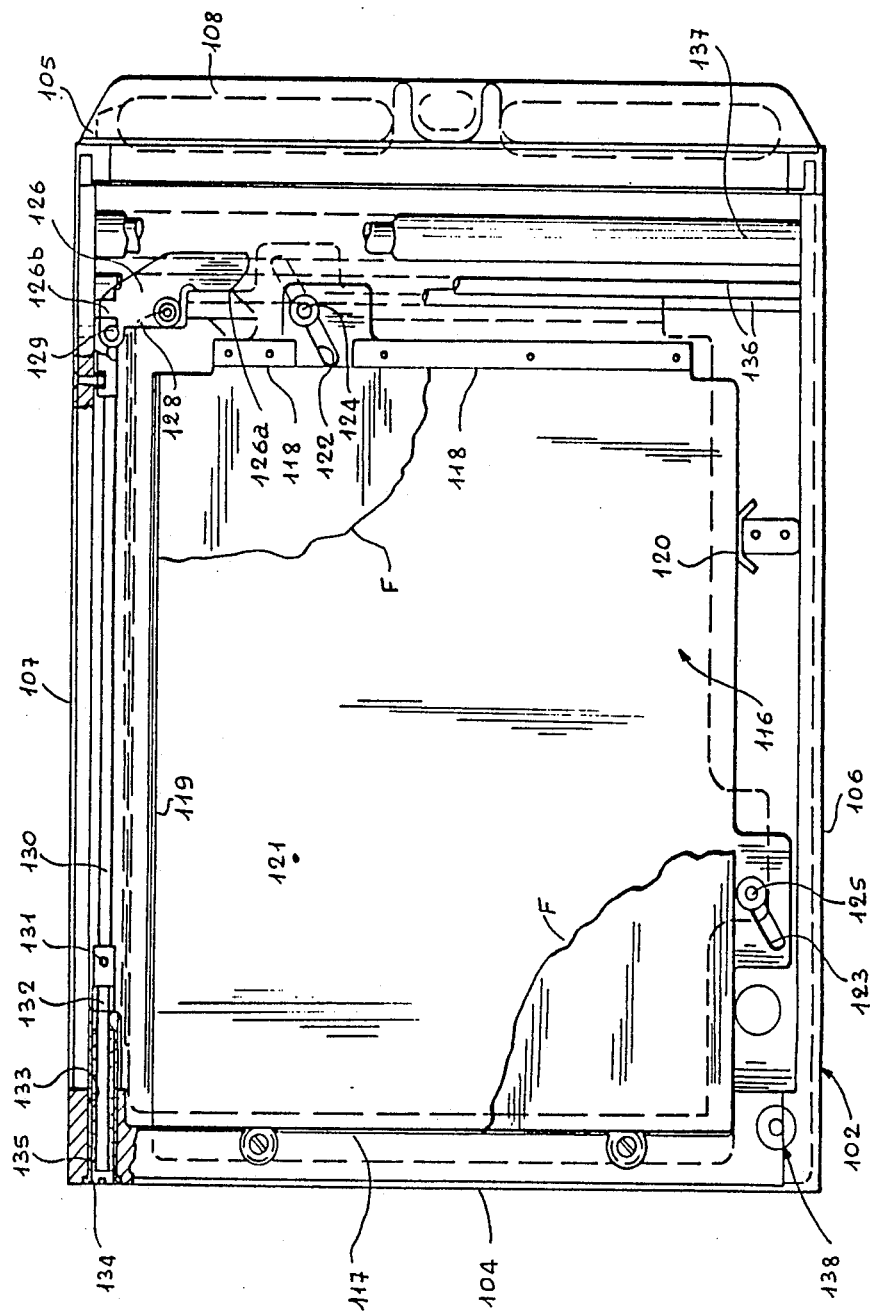
Figure 13:
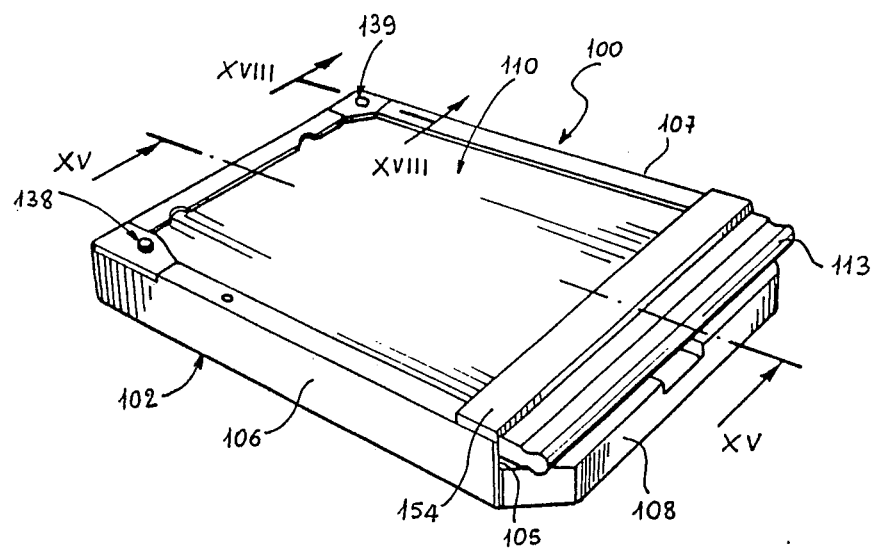
Figure 18:
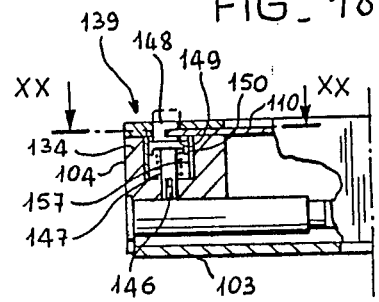
Figure 17:
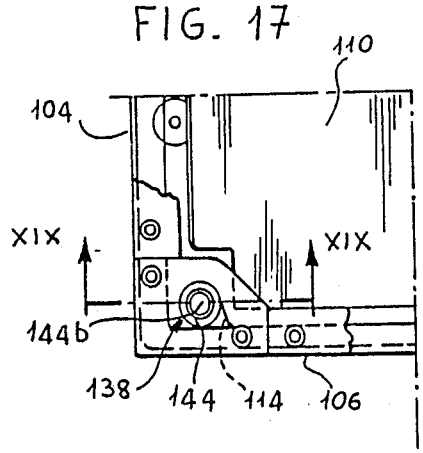
Figure 19:
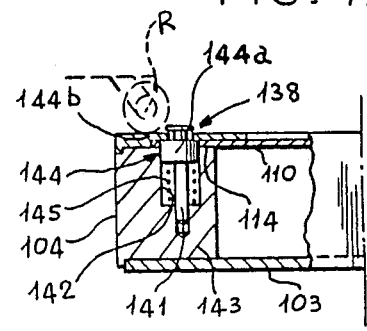

Further features of the present invention will be evident in the following detailed description with reference to the enclosed drawings supplied as mere non limiting examples, wherein:

FIG. 1 is a perspective back view of an x-ray film feeding magazine according to an embodiment of the present invention, shown in its light-tight closed position, FIG. 2 is a perspective front view of the feeding magazine shown in its partially opened position, FIG. 3 is a 180°-turned section according to III—III line of FIG. 1, FIG. 4 is a section according to IV—IV line of FIG. 3, FIG. 5 is similar to FIG. 4 with the feeding magazine in its partially opened position shown in FIG. 2, FIG. 6 is similar to FIG. 3 with the feeding magazine in its partially opened position shown in FIG. 5, FIGS. 7 and 8 show a first variant of FIGS. 3 and 6, FIGS. 9 and 10 show a second variant of FIGS. 3 and 6, FIGS. 11 and 12 show a third variant of FIGS. 3 and 6, FIG. 13 is a perspective back view of an x-ray film loading magazine according to a further embodiment of the invention shown in its closed light-tight position, FIG. 14 is an exploded perspective view of the magazine of FIG. 13, FIG. 15 is a larger scale longitudinal section along line XV—XV of FIG. 13, FIG. 16 is a partially sectioned plan view from above of the loading magazine of FIG. 13 in its open position, FIG. 17 is a plan view from above of a particular portion of the loading magazine of FIG. 16 in its closed light-tight position, FIG. 18 is a larger scale cross section view along line XVIII—XVIII of FIG. 13, FIG. 19 is a cross section view along line XIX—XIX of FIG. 17, and FIG. 20 is a section view along line XX—XX of FIG. 18.

With reference first to FIGS. 1 to 12, at 1 is shown an x-ray film feeding magazine as a whole, according to a first embodiment of the present invention, which can be used together with an x-ray film or sheet film handling automatic apparatus.

Magazine 1 essentially comprises a flat case 2, normally of light impermeable plastic material, and a tray slidingly introduced, as hereinafter described, into the case.

One end of case 2 is provided with an enlarged portion 4 forming a central handgrip 5 for transporting the magazine 1 and peripherally defining an annular flange 6 which is used for a light-tight closing of the chamber of an automatic handling apparatus into which magazine 1 is introduced when used.

The side of case 2 opposite the enlarged portion 4, shown with 7, is open to allow sliding of tray 3.

Such tray 3, normally made of light-impermeable plastic material, has a bottom wall 8, two side walls 9, 10 and two end walls 11 and 12, a front 11 and a back wall 12, respectively, the side walls are at right angles to the end walls. In particular, front wall 11 is constituted by a head which fits exactly, as clearly shown in FIG. 4, with the perimeter edge of opening 7 of case 2 in order to provide a light-tight insulation to the inside of magazine 1 when tray 3 is in the closed position. At opposite ends of head 11 there are two notches 11a used to engage with mechanical devices for opening and closing tray 3.

The magazine 1 further comprises externally driven actuator means; as it will be apparent from the following description, by "externally driven" it is meant that a portion of the magazine on the exterior of the walls can be contacted and moved to drive the actuator means which are within tray 3. The actuator means comprise two spaced notches 13 on the front side of head 11, at a right angle with respect to the bottom wall 8, communicating with respective holes 14 parallel to such bottom wall 8. In holes 14 there are two sliding pins 15, movable towards the inside of tray 3 against the action of respective helical pressure springs 16, carried by a rod 17 parallel and close to the inside surface of head 11. It is clear that rod 17 can be translated in parallel direction with respect to itself, against the action of helical springs 16, by a thrust exerted from the outside against the two pins 15.

The back wall 12 of tray 3 is centrally provided with a hook shaped notch 18 capable of cooperating with a hooking element 19 carried by a bush sliding, against the action of a helical compression spring 21, within a hole 22 centrally made in case 2 near the enlarged portion 4 and at right angle to the bottom wall 8 of tray 3. The hooking element 19 acts as a latch to snap the notch 18 when tray 3 is brought from the opened position, shown in FIGS. 2 and 5, to the closed position, shown in FIGS. 1 and . In consequence of this snap, magazine 1 can be transported in upside down condition by means of hand grip 5 without accidental opening of tray 3. To allow the opening of the tray, it is sufficient to exert a thrust from the outside onto bushing 20 to shift it against the action of spring 21 and consequently to release the hooking element 19 from notch 18.

Close and parallel to the back wall 12 there are a winding-up shaft 23, supported in revolving way by walls 9 and 10 and provided at one end with a working bushing 24 accessible from the outside, and a couple of superimposed rods 25 supported by side walls 9 and 10.

Rod 17 and the two rods 25 respectively form a front end gauge and a back end gauge anteriorly and posteriorly delimiting a housing, generically shown with 26, used to receive in the way described hereinafter an x-ray film packet F. The housing 26 is sideways delimited by a side gauge 27 integral with side wall 10 and by a side gauge 28 movable with respect to the side wall 9.

According to the variant illustrated in FIGS. 3 and 6, side gauge 28 has a a general shape of a straight rod, parallel to the side wall 9, with an elongated isosceles trapezoid substantially shaped horizontal section. In effect the side gauge 28 ends, shown with 28a and 28b, have slanting surfaces of an angle ranging from 30° to 60°, normally of 45°. Such surfaces 28a, 28b face complementary slanting surfaces 29a, 30a of two wedge-shaped elements 29, 30, respectively. The wedge-shaped element 29 is fastened in overhanging position to the end of front gauge 17 near side wall 9, while the wedge-shaped 30 is fastened in overhanging position to such side wall 9.

In consequence of the above described structure, the shifting of front gauge 17 towards the inside of tray 3 starting from the position illustrated in FIG. 3 causes a corresponding shifting of the side gauge 28 again towards the inside of tray 3 because of the sliding of the slanting surfaces 28a, 28b on the slanting surfaces 29a, 30a. The configuration shown in FIG. 6 is thus obtained.

The front gauge 17 and the side gauge 28 can therefore be moved to a stand-by position (FIG. 3) or to a work position (FIG. 6), thus changing the dimensions of housing 26 in the way described hereinafter.

In general, housing 26 is suitable to house x-ray films F of a given size: the variant according to FIGS. 3 and 6 relates to the largest allowed size. To easily determine such film size, on at least one side of case 2 there is applied a self-adhering label 31 carrying an electrically readable code showing the film size contained in magazine 1.

In use, the x-ray films F are introduced into housing 26 of tray 3, kept in its opened position, inside a light-tight flexible envelope as known from Italian patent No. 1,062,043. When the packet formed with the x-ray films F contained in the flexible envelope is introduced into housing 26, the front 17 and side 28 gauges are placed in the stand-by position of FIG. 3.

Removal of the flexible envelope from the x-ray films F is also known from the above mentioned Italian patent. In practicing the present invention, it is sufficient to say that such envelope is removed after having placed the tray 3 in its light-tight closed position with respect to case 2 by rotating the winding-up shaft 23 on which the back end of the envelope has been previously fixed. The shaft 23 is rotated as known by means of a suitable device introduced into the working bushing 24 from the outside.

Once the winding-up operation is completed, the flexible envelope is completely collected on shaft 23, as shown with B in the drawings, while the x-ray films F are available to be taken out. Normally such films F are kept in packets by means of a rigid or semirigid bottom sheet L folded onto the back side of the films F to form a back board L₁ facing the back gauge 25.

At this point, the feeding magazine 1 can be placed into the receiving station of a film F handling automatic apparatus, e.g. of the type object of the already cited Italian patent application Ser. No. 20,770 A/86, filed on June 12, 1986 by the same Applicant.

Till tray 3 is closed, the front 17 and side 28 gauges are kept in the stand-by position. In such a position, the delimited housing 26 is larger than the x-ray film F sizes. A given clearance is therefore present among the edges of the x-ray films F and gauges 17, 18, 25 and 27, respectively shown with x, y and z of FIG. 3. The sizes of such clearance practically corresponds to the thickness of the flexible envelope B which contained the films F when introduced into the housing 26.

Such a clearance is undesired since it is necessary that films F, subsequently taken out from magazine 1 inside the handling automatic apparatus, are placed precisely in order to avoid auxiliary centering devices.

Such a clearance and consequently the correct positioning and centering of films F is obtained by shifting the front gauge 17 and the side gauge 28 from the stand-by position to the work position shown in FIG. 6.

Such shift is obtained, when tray 3 is opened, by means of a thrust exerted from the outside onto the couple of pins 15. Such a thrust is obtained simply by making use of fixed striking pins P suitable to be engaged within notches 13 of head 11 in the last section of the opening stroke of tray 3, such as to push pins 15 towards the inside of magazine 1. Such thrust is translated into a forward movement of the front gauge 17 and into a consequent forward movement of the side gauge 28 in mutually right angle directions, such that films F are centered against such gauges 17 and 28 and back and side gauges 25 and 27.

It is clear that the centering action is repeated whenever the tray 3 is moved from the closed position to the opened position to allow the subsequent taking-out of the films F.

It is worthwhile noticing that the shape of the side gauge 28 and the way of its forward movement caused by the front gauge 17 can vary from those described and illustrated with reference to FIGS. 3 and 6. FIGS. 7 and 8, 9 and 10 and 11 and 12 show three variants. In such figures, the same or similar parts are shown with the same numerical references.

The variant of the present invention shown in FIGS. 7 and 8 has the feeding magazine 1 used with small-size x-ray films F, approximately corresponding to one fourth of that used for the magazine of FIGS. 3 and 6. In this case housing 26 is delimited in the front and in the back by a half 17a of front gauge 17 and by the corresponding half of back gauge 25, respectively. The side gauge 28 is placed in a substantially corresponding position to the center line of front gauge 17 and cooperates in the way as described with reference to FIGS. 3 and 6 with two wedge-shaped elements 29 and 30, the first of which protrudes from a corresponding intermediate portion of the front gauge 17 and the second one is fastened to the bottom wall 8 of tray 3.

FIG. 7 shows the situation where the x-ray films F are contained in housing 26 with the clearance corresponding to the thickness of the flexible envelope B removed and rolled up on the rolling shaft 23, while FIG. 8 shows the situation corresponding to the removal of such clearance obtained by means of the forward-movement of the front gauge 17 and of the corresponding forward-movement of side gauge 28, in the same way as that previously described.

The variant of FIGS. 9 and 10 refers again to the case where magazine 1 is used with x-ray films F having sizes corresponding to that of FIGS. 3 and 6. In this variant, the side gauge, shown with 32, consists of an element having a substantially isosceles triangle shape with the apex opposite to the base articulated by a pin 33 with a swinging arm 34, in its turn articulated by a pin 35 with an end portion of the front gauge 17 adjacent the side wall 9. The free end of the swinging arm 3 has a front cam profile 36 cooperating with a follower element constituted by a roller 37 supported in revolving manner by the bottom wall 8 of tray 3. A connecting rod element 38 connects the rotation axis of the roller 37 with a region of the side gauge 32 near the apex opposite to the front gauge 17, while the other apex carries a side separator element 40.

A second side separator element is shown with 42. This element is carried by a swinging lever 43 articulated by a pin 44 near the end of the side wall 10 adjacent to the front gauge 17. The swinging lever 43 is associated with an arm 45 carried by the end portion of the front gauge 17 adjacent to the side wall 10; the arm 45 constitutes a front cam element to actuate the swinging of lever 43.

FIG. 9 shows the situation where the x-ray films F are placed with clearance within housing 26. In this position, the front gauge 17 is kept in the stand-by position by the action of springs 16, and the swinging arm 34 keeps the side gauge 32 and the separator element 40 in the stand-by position. Even the swinging lever 43 carrying the separator element 42 is in the stand-by position.

When the forward-movement of the front gauge 17 is performed, in the way shown in FIG. 10, the swinging arm 34 is pushed under engagement against the roller 37 and, consequently to the cooperation between a cam surface 36 and such roller 37, is turned towards the inside of housing 26, thus moving the side gauge 32 forward together with the separator element 40. At the same time, the thrust element 45 causes a corresponding rotation of the swinging lever 43 towards the inside of housing 26 and the consequent forward-movement f the separator element 42. The clearance of the x-ray film packet F inside the housing 26 is thus removed, while the separator elements 40 and 42 protrude above such packet so as to make easier the separation of the film F placed on the top of the packet during the taking-out operation.

FIGS. 11 and 12 refer to the case where the magazine 1 is used to contain medium-size x-ray films F with reference to the film sizes of FIGS. 3 and 6 or 9 and 10 and of FIGS. 7 and 8. In this case the side gauge 32 is quite the same as that of FIGS. 9 and 10, but it is carried by the swinging arm 34 through a spacing arm 46 articulated by a pin 47 with such swinging arm 34. The articulation pin 35 of the swinging arm 34 is positioned at a given distance from the end portion of the front gauge 17 adjacent to the side wall 9. The spacing arm 46 is parallel to the front gauge 17 and carries a guiding pin 48 sliding within a slanting guiding slot 49 made in a support 50 fastened to the bottom wall 8 of the tray 3.

Even in this case, two side separator elements 40, 42 are provided. They are quite the same as those described with reference to FIGS. 9 and 10.

The forward movement of the side gauge 32 and of the two side separator elements 40 and 42 from the stand-by position of FIG. 11 to the work position of FIG. 12 is obtained by forward-moving the front gauge 17, in a way like that previously described with reference to FIGS. 9 and 10.

With reference now to FIGS. 13 to 20, under 101 there is shown an x-ray film magazine as a whole according to a second embodiment of the invention, which can be used together with a film or x-ray sheet F automatic handling apparatus, in particular an apparatus for the day-light transfer onto such x-ray films of video images generated by a TV-viewer.

The loading magazine 101 essentially comprises a tray 102, normally made of light-impermeable plastic material, formed by a bottom wall 103, a front wall 104, a back wall 105 and two side walls 106, 107. The back wall 105 is provided with an external tail working as a handgrip 108 and, above this, a longitudinal slit 109 through which there is slidingly engaged a cover 110 for light-tight closing tray 102. Cover 110 comprises a plate 111 slidingly guided along longitudinal grooves in side walls 106 and 107 (only that corresponding to side wall 107 is shown under 112 in FIG. 14) and a portion of handgrip 113 carried by an end portion of plate 111 and protruding, when cover 110 is closed, outside slit 109 above handgrip portion 8 of tray 102.

In correspondence with the end of plate 111 opposite to handgrip 113 there are two side notches 114, 115 the first of which has a substantially circular profile (FIG. 17) and the second a straight-line profile (FIG. 20). The work of notches 114 and 115 will be explained hereinafter in the description.

Inside tray 102, a housing 116 is formed to receive a packet of x-ray films F of a given size, for instance 8×10. Such x-ray films F are contained inside a flexible light-tight envelope.

Housing 116 is delimited by four gauges, i.e. a front end gauge 117, a back end gauge 118 and side gauges 119, 120, respectively. Front gauge 117 and side gauge 120 are stationary since respectively secured to front wall 104 and side wall 106 of tray 102, while back gauge 118 and side gauge 119 are movable with respect to the corresponding back wall 105 and side wall 107 of such tray 102. Back gauge 118 and side gauge 119 are carried by a movable supporting plate 121 parallel to the bottom wall 103 which is slidingly supported by the bottom wall 103 in diagonal direction. As can be seen in FIGS. 14 and 16, near back wall 105 and side wall 106 of tray 102 the plate 121 contains two slantwise placed slots 122, 123 into which corresponding roller pins 124, 125, carried by bottom wall 103 and at right angle therewith, are engaged. According to such arrangement, supporting plate 121 can be moved from a stand-by position receiving the x-ray film packet F with clearance, shown with a dotted line in FIG. 16, and a film centering work position, shown with a continuous line in the same figure, wherein back gauge 118 and side gauge 119 are put closer to the stationary front gauge 117 and the stationary side gauge 120 of a pre-set quantity to remove such clearance. The diagonal translation of movable plate 21 from the stand-by to the work position is actuated by externally driven actuator means which include a swinging rocking lever 126 articulated near the edge formed between back wall 105 and side wall 107 around a trunnion 128 carried by bottom wall 103 at right angle therewith. A first arm 26a of rocking lever 126 is contrasted by back gauge 118 at the opposite side of housing 116, while a second arm 126b is articulated by a pin 129 with the end of a driving rod 130 sliding near and parallel to the inside surface of side wall 107. The other end of driving rod 130 is connected in 131 with a contrasting pin 132 slidingly guided inside a guiding hole 133 made in a thickened portion 134 of side wall 107 and having an outlet in correspondence with the external surface of front wall 104. The contrasting pin 132 has an end head 134a normally kept at the same level of the external surface of front wall 104, as shown in FIG. 16, by the action of a helical compression spring 135. In such a position, rocking lever 126 is in the position shown with the continuous line in FIG. 16 and corresponding to the stand-by position of movable plate 121 shown with the dotted line in the same figure. When the contrasting pin 132 is moved forward to back wall 105, in a way which will be explained hereinafter, head 134a is pushed from the outside and the corresponding translation of driving rod 130 makes rocking lever 126 to swing to the position shown with the dotted line in FIG. 16 and, consequently, the supporting plate 121 to move forward into the position shown with the continuous line in the same figure.

Between back gauge 118 and back wall 105 of tray 102 and parallel therewith there are two rods 136, laid one upon the other, and behind these rods a winding-up shaft 137 is supported by side walls 106 and 107. The winding-up shaft 137 can rotate and at one end is provided with an externally driven working bushing, not shown in the drawings, by means of which the shaft can be rotated manually. Rods 136 and winding-up shaft 137 make up a device for removing the flexible envelope containing the film packet F introduced for use into the inside of housing 116, in the way explained hereinafter.

While back gauge 118 and side gauges 119 and 120 have a generally flat shape, for purposes which will be better explained hereinafter, front gauge 117 preferably has an arched, generally cylindrical shape with the convex side turned towards the inside of housing 116.

The magazine 101 is further provided with a mechanical device 138 to lock cover 110 in the light-tight closed position of tray 102, with a mechanical device 139 securing such tray 102 within a receiving structure of an x-ray film F handling apparatus, which is operated by pulling out cover 110, as well with a device 140 for light-tight closing slit 109 of back wall 105 after having pulled out cover 110.

Locking device 138, shown in details in FIGS. 12 and 19, comprises a pin 141 arranged so as it can slide at right angle to the bottom wall 103 within a housing 142 formed in a thickening 143 of the end of front wall 104 adjacent to side wall 106 and open upwards. Pin 141 is provided with an end head 144 having a greater diameter lower portion 144a and a smaller diameter higher portion 144b. A helical compression spring 145 acts against such end head 144 and tends to press pin 141 out of housing 142, i.e. into the extracted position shown in FIGS. 13 and 19 wherein a part of portion 144a and portion 144b protrude above the plane defined by the upper surfaces of walls 104, 106 and 107 of tray 102. In such a position head 144 cooperates with end notch 114 of plate 111 of cover 110, when this is in its closed position, such that the lower part of portion 144a engages into such notch 114 thus preventing cover 110 from being slidingly opened.

To remove such engagement and thus allow cover 110 to be drawn out, a push is to be exerted from the outside thus pressing pin 141 downwards against the action of spring 145. This push can be exerted either by hand or through a mechanical working element carried by the receiving structure of an x-ray film F handling apparatus, for instance a roller schematically shown under R in FIG. 19. Upon such external push, pin 141 reenters housing 142 and the larger diameter portion 144a disengages from notch 114 thus allowing cover 110 to be drawn out.

The securing device 139, shown in details in FIGS. 8 and 20, comprises a pin 146 sliding in a housing 157 of thickened portion 134 of front wall 104 in the perpendicular direction with respect to bottom wall 103. Pin 146 is under the action of a compression helical spring 147, which tends to push it outwards to a drawn-out position shown in FIG. 14, and is provided with an end head 148 containing a notch 149 delimited at the bottom by a slanting chute surface 150. Notch 149 and chute surface 150 cooperate with notch 115 of plate 111 of cover 110. When cover 110 is in its closed position as shown in FIGS. 13, 19 and 20, pin 146 is thus kept in a reentered position, against the action of spring 147, with its head 149 at the same level of the plane delimited by the upper surfaces of walls 104, 106 and 107 of tray 102.

When cover 110 is drawn out by disengaging locking device 138, head 148 is released and pin 146 is pushed by spring 147 into the drawn-out position shown in FIG. 14. In such a position head 148 engages a complementary notch formed in the receiving structure of an x-ray film F handling apparatus, such that tray 102 cannot be removed unless cover 110 is pushed in and closed, thus causing pin 146 to be pressed into its reentered position by the cooperation of the edge of side notch 115 and the chute portion 150 of notch 149.

The light-tight closing device 140, shown in details in FIG. 15, comprises a prolongated protecting element 151 introduced into slot 109 and pressed by spring push rods 152 introduced into back wall 105 towards a slanting raised position for engagement in a complementary recess 153 gained in a listel 154 along the upper surface of back wall 105. The protecting element 151 can be moved to an unworking lowered position against the action of said spring push rods 152, shown in FIG. 15, by introducing plate 111 of cover 110 through slot 109.

During use, the x-ray films F are introduced into housing 116 of tray 102, after having taken out cover 110, inside a light-tight flexible envelope. When the x-ray film packet F contained in the flexible envelope is introduced into housing 116, movable plate 121 is kept in the stand-by position shown with dotted line in FIG. 16.

After having introduced the packet, cover 110 is introduced through slot 109 and pushed into the position light-tight closing housing 116 thus causing head 144 to engage into side notch 114 and notch 149 into side notch 115 of plate 111.

The flexible envelope containing the x-ray films F is then removed, as already described in respect of magazine 1; such envelope is removed by rotating winding-up shaft 137, on which the rear portion of the envelope has been previously locked, by means of guiding rods 136. Shaft 137 is rotated, in known manners, by introducing a proper device into the working bushing of such shaft 137.

As winding-up is terminated, the flexible envelope is entirely collected on shaft 137 and the x-ray films F are ready to be taken out. Without an external push exerted on pin 132, movable plate 121 with back gauge 118 and side gauge 119 is kept in a stand-by position, and housing 116 has larger dimensions than the x-ray films F laid therein. There is therefore a given clearance between the edge of the x-ray films F and gauges 117, 118, 119 and 120 and the values of such clearance practically correspond to the thickness of the flexible envelope containing the films when introduced into housing 116.

Such a clearance is undesired since films F, afterwards taken out from magazine 101 inside the automatic handling apparatus receiving it, are to be placed in the proper way to avoid the use of auxiliary centering devices.

The removal of such clearance and consequently the right positioning and centering of films F is obtained by shifting movable plate 121 and therefore back gauge 118 and side gauge 119 from the stand-by to the work position shown with a continuous line in FIG. 16.

Such a shifting is performed after having positioned magazine 101 into the receiving station provided in an x-ray film F automatic handling apparatus. In fact, such station is conveniently provided with a stationary gauge which upon introduction of the loading magazine 101 into the station shall interact with pin 131 by pushing it towards back wall 105 of tray 102 against the action of spring 135, such as to cause driving rod 130 to be correspondingly moved forward and rocking lever 126 to swing from the position shown with a continuous line in FIG. 16 to that shown with a dotted line in the same figure. As said previously, this causes plate 121 and gauges 118 and 119 carried thereby to be moved forward in diagonal direction, thus centering films F between movable gauges 118 and 119 and stationary gauges 117 and 120. While plate 121 is moved forward, the arched shape of front gauge 117 causes the x-ray films F to be properly detached one from the other, thus making easier the separation of one film F from the adjacent ones during the subsequent taking-out operations and drastically reducing the risk of adhesion.

The detaching action of films F provided for by front gauge 117 is made easier by the fact that magazine 101 is normally introduced into the receiving station of the apparatus in a downwards slanting position. This allows the films to be kept constantly in contact with the arched surface of gauge 117 and a slight friction to be caused between the films and said arched surface during the taking-out operation, thus making still easier the detachment of a film from the underlying ones which would otherwise be raised since adhering to the taken-out film.

To reduce furthermore the adhesion phenomenon, the receiving station of the apparatus is provided with a nozzle suitable to be introduced into tray 102 near thickening 143 and to generate and address an air flow under pressure under the edge of the films as they are taken out.

Such station is arranged also to control the release of locking device 138 of cover 110, e.g. by means of roller R shown in FIG. 19, which upon introduction of magazine 101 into the receiving station causes pin 141 to be lowered against the action of spring 145 and consequently the larger diameter portion 144a of head 144 to be disengaged from side notch 114 of plate 111.

In this way cover 110 can be removed from tray 102, through slot 109, by exerting a manual traction onto handgrip 113. The backward movement of cover 113 causes side notch 115 of plate 111 to be disengaged from notch 149 of pin 146 which is then free to move upwards under the action of spring 147 to engage into a complementary notch made in the receiving region of the apparatus. Magazine 101 is thus secured in the receiving station and is prevented from being removed therefrom till cover 110 is not again placed into its light-tight closed position.

When cover 110 is completely drawn out, the protecting element 151 is free to be placed slantwise to engage into recess 153 by spring pins 152, thus light-tight closing slot 109. In this way housing 116 is light-tight isolated from the outside of the apparatus receiving station.

I claim:

1. An x-ray film feeding magazine, for use in an automatic film handling apparatus, comprising a tray having a bottom wall, a front wall, a back wall and two side walls and quadrangular housing means formed in the tray for receiving an x-ray film packet, comprising a front end gauge near the front wall of the tray, a back end gauge near said back wall and two side gauges near said two sides, one of said end gauges and at least one of said side gauges being movable between a stand-by position for receiving the x-ray film packet with clearance and a work position for centering the films of the packet, and externally driven actuator means in the tray to move said movable gauges from the stand-by position to the work position.

2. The magazine of claim 1, characterized by comprising connection means between said end movable gauge and at least one side movable gauge, in order to move the gauges from the stand-by position to the work position simultaneously.

3. An x-ray film feeding magazine, for use in an automatic film handling apparatus, comprising a tray having a bottom wall, a front wall, a back wall and two side walls and a quadrangular housing means formed in the tray for receiving an x-ray film packet, comprising a front end gauge near the front wall of the tray, a back end gauge near said back wall and two side gauges near said two side walls, one of said end gauges and at least one of said side gauges being movable between a stand-by position for receiving the x-ray film packet with clearance and a work position for centering the films of the packet, and externally driven actuator means in the tray to move said movable gauges from the stand-by position to the work position, further comprising connection means between said end movable gauge and at least one side movable gauge, in order to move the gauges from the stand-by position to the work position simultaneously, the connection means comprising two slanting surface portions carried by said movable side gauge and wedge-shaped elements, having complementary slanting surfaces, cooperating with said slanting surface portions of the movable side gauge, one of said wedge-shaped elements being movable together with the movable end gauge and the other one being stationary with respect to the tray.

4. The magazine of claim 3, characterized by the fact that the movable wedge-shaped element is attached to an end portion of the movable end gauge.

5. The magazine of claim 3, characterized by the fact that the movable wedge-shaped element is attached to an intermediate portion of the movable end gauge.

6. An x-ray film feeding magazine, for use in an automatic film handling apparatus, comprising a tray having a bottom wall, a front wall, a back wall and two side walls and quadrangular housing means formed in the tray for receiving an x-ray film packet, comprising a front end gauge near the front wall of the tray, a back end gauge near said back wall and two side gauges near said two side walls, one of said end gauges and at least one of said side gauges being movable between a stand-by position for receiving the x-ray film packet with clearance and a work position for centering the films of the packet, and externally driven actuator means in the tray to move said movable gauges from the stand-by position to the work position, further comprising connection means between said end movable gauge and at least one side movable gauge, in order to move the gauges from the stand-by position to the work position simultaneously, the connection means comprising a swinging arm having an end articulated to the movable end gauge and an opposite end carrying said movable side gauge in an articulated way and forming a front cam profile cooperating with a follower element stationary with respect to the magazine, articulated interconnection means being provided between said movable side gauge and the tray.

7. The magazine of claim 6, characterized by the fact that the follower element is a roller.

8. The magazine of claim 7, characterized by the fact that the swinging arm is articulated to an end of the movable end gauge, that the movable side gauge is directly articulated to the swinging arm and that the interconnection means include a connecting rod element placed between the axis of rotation of the roller and the movable side gauge.

9. The magazine of claim 6, characterized by the fact that the swinging arm is articulated to an intermediate portion of the movable end gauge, that a spacing arm is provided which is articulated to the end of the swinging arm opposite to the movable end gauge and is extending parallel thereto, said spacing arm carrying said movable side gauge, and that said interconnection means include a guiding pin carried by said spacing arm and movable within a slanting guide stationary with respect to the tray.

10. The magazine of claim 2, characterized by the fact that only one of said side gauges is movable, and that the connection means comprise a supporting plate for the x-ray films slidingly guided on said bottom wall of the tray in diagonal direction of said housing, said movable side and end gauges being fixed on the supporting plate.

11. The magazine of claim 1, characterized by the fact that the end gauge which is not movable has an arched shape with a convex surface toward the movable end gauge.

12. The magazine of claim 1, characterized by the fact that said movable end gauge is the front end gauge.

13. The magazine of claim 12, characterized by the fact that said actuator means comprise contrast elements associated with the front end gauge and accessible from the outside through the front wall of the tray, by means of which an external thrust is transmitted to said front end gauge to move it from the stand-by position to the work position, elastic return means being associated with said contrast elements to hold said front end gauge in the stand-by position in absence of said external thrust.

14. The magazine of claim 13, characterized by the fact that the contrast elements comprise spring pins carried in transversely spaced positions with respect to the front end gauge and slidingly housed in respective guiding passing notches made in said front wall of the tray.

15. The magazine of claim 1, characterized by the fact that said movable end gauge is the back end gauge.

16. The magazine of claim 15, characterized by the fact that said actuator means comprise: a contrasting element, slidingly supported in the tray near and parallel to one of the side walls of the tray and externally controlled through the front wall of the tray, said contrasting element being arranged to receive an external thrust tending to translate said contrasting element towards the back wall of the tray, against the action of elastic return means, a rocking lever articulated to the bottom wall of the tray near its back wall, said rocking lever having a first arm against said back end gauge, and a driving rod connecting said contrasting element with a second arm of said of said rocking lever.

* * * * *